June 24, 1969  F. R. SMITH  3,451,701
BALL JOINT CONSTRUCTION
Filed Feb. 15, 1968
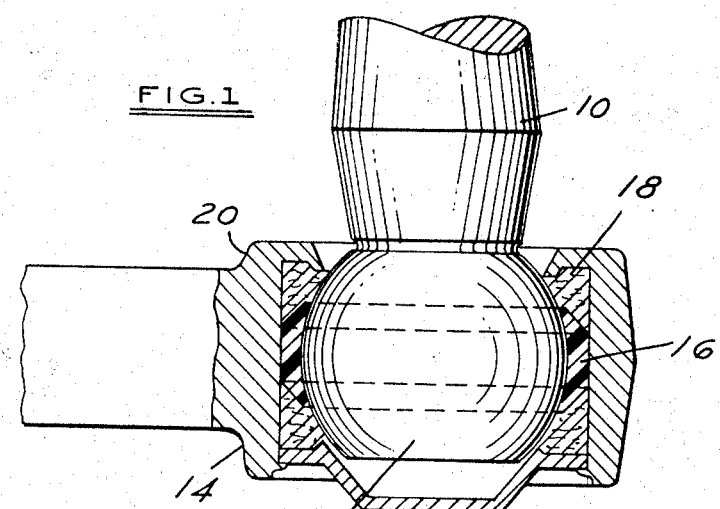
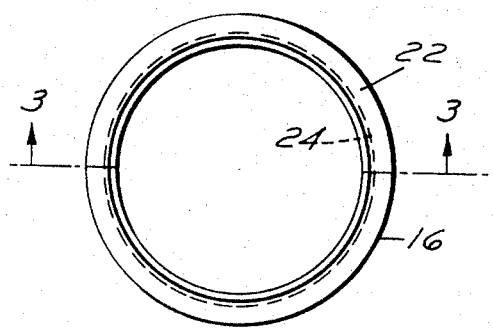
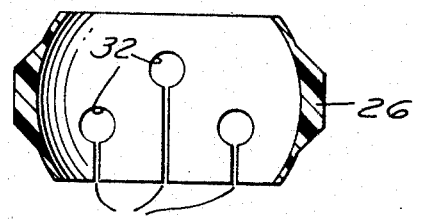
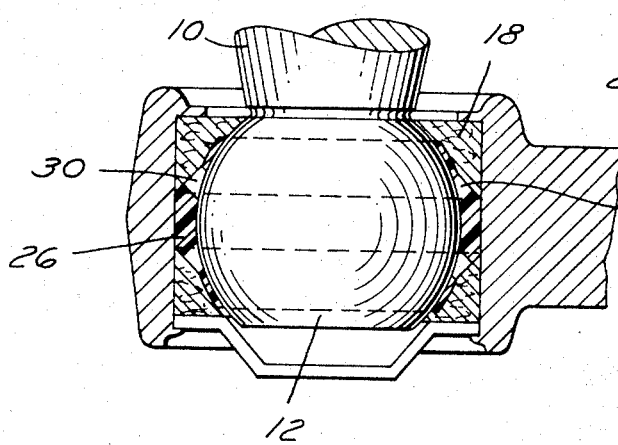
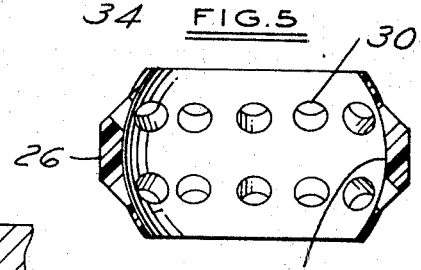
INVENTOR
FREDERIC R. SMITH
BY
Barnes, Kisselle, Raisch & Choate
ATTORNEYS United States Patent Office 3,451,701
Patented June 24, 1969

3,451,701
BALL JOINT CONSTRUCTION
Frederic R. Smith, Whitmore Lake, Mich., assignor to
O & S Bearing & Mfg. Co., Whitmore Lake, Mich.,
a corporation of Delaware
Filed Feb. 15, 1968, Ser. No. 705,689
Int. Cl. F16c 11/06
U.S. Cl. 287—90                5 Claims

ABSTRACT OF THE DISCLOSURE

This invention relates to improvements in ball joint constructions of the type commonly used in automotive steering linkages and torque rod ends. The construction disclosed in this patent utilizes an improvement comprising a split retainer ring formed of a plastic material with good bearing characteristics backed by a compressible-expansible lubricant impregnated bearing material. This improvement has resulted in a ball joint construction which provides satisfactory torque or frictional characteristics for a substantially increased or prolonged period of use.

Background of the invention

This invention relates to improvements in ball joint construction and more particularly to improvements in the type of ball joint construction commonly used in motor vehicle steering system linkages.

In the prior art devices, as disclosed in the Kogstrom U.S. Patent No. 2,921,809 and in the Smith et al. U.S. Patent No. 3,216,754, it has long been a problem to provide a ball joint construction which will have satisfactory torque or frictional characteristics throughout a long period of use. Usually the slip fit between the ball and the ball socket retainer becomes loose or wobbly due to the wearing away of the surfaces which are in intimate contact with each other. Typically, the torque or frictional characteristics of the prior art devices have become unsatisfactory after 50,000 to 100,000 test cycles under maximum rated load conditions.

In the ball joint construction disclosed herein, a retainer ring of relatively dense material is interposed between the ball of the ball stud and the socket of the body member around the equatorial area of the ball. An oil impregnated fibrous material is compacted or compressed into the cavity between the ball socket and the retainer ring at each end of the ring. This fibrous material of compressible-expansible characteristics provides a self-lubricating ball joint construction and it also locates the retainer ring and tends to force it into contact with the ball. By varying the force with which the inner surface of the retainer ring bears on the surface of the ball, the torque or frictional characteristics of the ball joint can be altered.

In its normal operating position, the transverse forces or thrusts of the ball stud are transmitted by the retainer ring to the main body rather than being transmitted by the fibrous material to the main body. It is believed that the shielding of the fibrous material from the full thrust or load transmitted by the ball together with providing a resilient, self-lubricating material to back up the dense retainer ring has substantially improved the useful life span of this bass joint construction. The fibrous material is preferably in contact with the ball at the edges of the retainer ring to serve as a seal against water, dust and dirt and also to impart a lubricant coating directly to the ball which can work into the bearing surfaces. The retainer ring receives the high proportion of the load and prevents the full pressure per square inch factor from being transmitted to the fabric, thereby causing the fabric to lose a portion of its compensating resiliency.

Description of the invention

A principal object of this invention is to provide a ball joint construction which maintains satisfactory torque characteristics for a significantly increased life span.

Another object of this invention is to provide a ball joint construction which is self-lubricating and which will retain its torque characteristics over a long period of use.

Other objects and features of this invention will be apparent from the following description and claims in which there is found the manner of making and using the invention and the best mode contemplated by the inventor for carrying out the invention.

Drawings accompany this disclosure and the various views thereof may be briefly described as:

FIGURE 1, a side elevational view partialy in section of one embodiment of a ball joint construction.

FIGURE 2, a plan view of one embodiment of a retainer ring.

FIGURE 3, a sectional view on line 3—3 of FIGURE 2.

FIGURE 4, a sectional side elevational view of a second embodiment of a ball joint construction.

FIGURE 5, a sectional side elevational view of a second embodiment of a retainer ring.

FIGURE 6, a sectional side elevational view of a third embodiment of a retainer ring.

Referring to the drawings

In FIGURE 1, a ball stud 10 with a ball 12 is captivated in a housing or body member 14 by a split retainer ring 16 and is shown surrounded by a lubricant impregnated fibrous material 18 such as cotton wicking. A suitable lubricant for impregnating the fibrous material is the fatty acid compound disclosed in the Delp U.S. Patent No. 2,379,478, issued July 3, 1945.

Retainer ring 16 shown in FIGURES 2 and 3 is formed as a split ring, for ease of assembly, preferably of a high density plastic material, such as nylon having good bearing characteristics. Outside and inside diameters and hence the thickness of the center portion of retainer ring 16 is designed so that retainer ring 16 fits snugly between ball 12 and body member 14 around a relatively wide equatorial area of the ball. By varying the total surface area of retainer ring 16 which is in contact with ball 12 and the pressure with which retainer ring 16 bears on the ball 12, the torque or frictional characteristics of the ball joint construction can be altered.

Lubricant impregnated fibrous material 18 is compacted or compressed between a portion of a wall 20 of body member 14 and retainer ring 16. The force created by compressed fibrous material 18, acting on beveled exterior surfaces 22 which are at an inclined angle to the major and minor axes of retainer ring 16, tends to keep inner surface 24 of the retainer ring in contact with the ball. This force tends to compensate for wear on either the ball or the inner surface 24, thereby insuring a uniform and constant torque. By varying the degree to which the fibrous material 18 is compacted or compressed and the oblique angle of the beveled exterior surfaces 22, the total force applied to the ball 12 by the retainer ring 16 can be altered.

Normally the shock and thrust of the ball stud 10 is in a lateral direction and is transmitted through the retainer ring 16 to the body member 14. However, any axial thrust is, in part, transmitted through the fibrous material to the body member. Perhaps the fact that the retainer ring 16 transmits the lateral ball stud 10 thrust forces to the body member 14 and that it also reduces the area of contact between the fibrous material 18 and the ball 12 explains the substantial increase in the useful life span of this ball joint construction.

While the high density plastic has inherently good bearing characteristics, nevertheless, it is improved by additional lubrication. This is furnished by the lubricant impregnated cotton material which has an inherent resilience and can be characterized as a compressible-expansible material.

In FIGURES 4 and 5 is shown an alternate ball retainer 26 structure. This construction provides more retainer surface area 28 in contact with the ball 10 than the retainer surface area 28 in contact with the ball 10 than the retainer 22 shown in FIGURE 3. The radially spaced openings 30 in the ball retainer 26 allow the fibrous material 18 to contact the ball 12 so that the ball is properly lubricated while still transmitting most of the force due to the compression of the fibrous material to the retainer 26, rather than bearing directly on the ball 12. This arrangement minimizes the surface area of the fibrous material 18 which is bearing directly on the ball 12, and it also reduces the force with which the fibrous material passing through the openings 30 bears on the ball 12. This arrangement tends to further reduce the rate of wear of the fibrous material by minimizing its area of contact with the ball and by reducing the force with which it bears on the ball, which results in a further increase in the useful life span of the ball joint construction.

In FIGURE 6 a second alternate ball retainer 26 structure is shown. In the preferred construction of this retainer there are six radially and alternately axially spaced openings 32. Each opening 32 is generally bulbous shaped with all of the slot portions 34 of each opening extending axially in the same direction. The slot portions 34 make the retainer 26 more flexible and hence responsive to the forces applied to the retainer by the compressed fabric 18. The retainer is installed in body member 14 with the slot portions 34 pointing toward the cap or closed end of the body member to eliminate a path for the entry of dirt to the ball 12 if it should get past the external seal of the body. The slot portions also make it easier to insert the ball 12 into the retainer 26.

Laboratory testing of the described ball joint structure by repeated cycling under full load conditions has revealed that the torque or tightness of the ball 10 in the body member 14 will be temporarily decreased when the ball joint is subjected to long periods of continuous cycling. However, when this ball joint construction is allowed to remain idle or inactive for a few hours, the torque or tightness of the ball 10 in the body member 14 returns to normal. This latter test mode of cycling the ball joint for a period of time and then allowing it to remain idle for a short period of time to recover or regain its original torque characteristics represents the typical cycle or mode of operation of most automobiles or other motor vehicle steering system linkages.

What is claimed as new is as follows:

1. In a ball joint construction in which a space between a ball stud and a housing member is filled with a bearing material that improvement which comprises:
    (a) a relatively rigid retainer ring of high density plastic bearing material surrounding a relatively large equatorial area of the ball around an axis coincident with the axis of the stud with the ring having a sufficient thickness at its midsection to substantially fill the space between the ball and the housing member and having portions of gradually reduced thickness extending from the midsection toward the edges and terminating in a thin, hollow, segmental spherical sheath at each end of the ring having an inner periphery complementary to that of the ball, and
    (b) an annular body of readily deformable expansible-compressible material compacted into engagement with the ball at the end of each sheath and wedged in part between the outside of the reduced portion of the ring and the inner periphery of the housing member and also about the free end of each said sheath to apply axial and radial forces on the ring.

2. A ball joint construction as defined in claim 1 in which said expansible compressible material extends beyond said ring to be in part in annular contact with the ball to serve as an annular seal area at the stud end of the ball, said material being impregnated with a lubricant which imparts to the surface of said ball at said seal area.

3. A ball joint construction as defined in claim 1 in which portions of the retainer ring underlying the said expansible-compressible material are provided with circumferentially spaced perforations, and the expansible-compressible material is impregnated with a lubricant.

4. A ball joint construction as defined in claim 3 in which slits are provided in said ring from said perforations to one end of said ring to improve the flexibility and be more responsive to the expansible qualities of said material.

5. A ball joint construction as defined in claim 4 in which the housing member has a closed end opposite a stud opening therein and the slits of the ring extend toward the closed end.

References Cited

UNITED STATES PATENTS

| 2,683,637 | 7/1954 | Skillman et al. | 308—239 |
| 3,086,801 | 4/1963 | Herbenar. | |
| 3,216,754 | 11/1965 | Smith et al. | 287—87 |
| 3,226,141 | 12/1965 | Sullivan | 287—87 |
| 3,233,929 | 2/1966 | Herbenar | 287—87 |
| 2,921,809 | 1/1960 | Kogstrom. | |
| 3,362,735 | 1/1968 | Maxeiner. | |

FOREIGN PATENTS

| 1,431,222 | 1/1966 | France. |
| 1,019,966 | 2/1966 | Great Britain. |

CARL W. TOMLIN, *Primary Examiner.*

ANDREW Y. KUNDRAT, *Assistant Examiner.*

U.S. Cl. X.R.

308—72

UNITED STATES PATENT OFFICE

Certificate

Patent No. 3,451,701　　　　　　　　　　　　　　Patented June 24, 1969

Frederic R. Smith

Application having been made by Frederic R. Smith, the inventor named in the patent above identified; and O & S Bearing & Mfg. Co., Whitmore Lake, Mich., a corporation of Delaware, the assignee, for the issuance of a certificate under the provisions of Title 35, Section 256, of the United States Code, adding the name of Edward A. Snidar as a joint inventor, and a showing and proof of facts satisfying the requirements of the said section having been submitted, it is this 20th day of January 1970, certified that the name of the said Edward A. Snidar is hereby added to the said patent as a joint inventor with the said Frederic R. Smith.

LUTRELLE F. PARKER
*Law Examiner.*